United States Patent
Zhang et al.

(10) Patent No.: US 6,635,735 B1
(45) Date of Patent: Oct. 21, 2003

(54) COATING COMPOSITION

(75) Inventors: Zuyi Zhang, Kanagawa (JP); Hajimu Wakabayashi, Hyogo (JP)

(73) Assignee: Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 10/009,810

(22) PCT Filed: Jun. 16, 1999

(86) PCT No.: PCT/JP99/03215

§ 371 (c)(1),
(2), (4) Date: Dec. 17, 2001

(87) PCT Pub. No.: WO00/77105

PCT Pub. Date: Dec. 21, 2000

(51) Int. Cl.⁷ ................................................ C08G 77/08
(52) U.S. Cl. ............................ 528/14; 528/12; 528/26; 528/16; 528/43; 528/32; 524/588; 524/858; 524/863; 502/171
(58) Field of Search .............................. 528/12, 14, 26, 528/32, 16, 43; 524/588, 858, 863; 502/171

(56) References Cited

U.S. PATENT DOCUMENTS

| 4,348,431 | A | | 9/1982 | O'Malley |
| 4,677,160 | A | | 6/1987 | Kondo et al. |
| 5,004,771 | A | | 4/1991 | Feder et al. |
| 5,175,057 | A | | 12/1992 | Wengrovius et al. |
| 5,190,804 | A | | 3/1993 | Seto et al. |
| 5,910,272 | A | * | 6/1999 | Kushibiki et al. |

FOREIGN PATENT DOCUMENTS

| EP | 0 210 442 | 2/1987 |
| JP | 57-165429 | 10/1982 |
| JP | 61-246255 | 11/1986 |
| JP | 62-001750 | 1/1987 |
| JP | 62-169806 | 7/1987 |
| JP | 62-032157 | 12/1987 |
| JP | 63-117074 | 5/1988 |
| JP | 01-203478 | 8/1989 |
| JP | 02-135261 | 5/1990 |
| JP | 02-218723 | 8/1990 |
| JP | 03-031380 | 2/1991 |
| JP | 4-175388 | 6/1992 |
| JP | 04-370146 | 12/1992 |
| JP | 05-117590 | 5/1993 |
| JP | 05-186693 | 7/1993 |
| JP | 06-049412 | 2/1994 |
| JP | 06-220402 | 8/1994 |
| JP | 08-113760 | 5/1996 |
| JP | 09-316397 | 12/1997 |
| JP | 10-007988 | 1/1998 |
| JP | 10-168393 | 6/1998 |
| JP | 11-241047 | 9/1999 |

\* cited by examiner

Primary Examiner—Robert Dawson
Assistant Examiner—Kuo-Liang Peng
(74) Attorney, Agent, or Firm—Young & Thompson

(57) ABSTRACT

A coating composition having (A) an alcohol dispersion which includes silica having the hydrophobic surface and dispersed in an alcohol dispersion medium, the content of silica in a solid substance being 80% by weight or more; (B) a solution including a silicone oligomer which is obtained by a reaction of an alkoxysilane with water and has an average structural unit represented by $R^1{}_nSiO_{x/2}(OH)_y(OR^2)_z$ ($R^1$ representing an alkyl group, phenyl group or vinyl group, $R^2$ representing an alkyl group and n, x, y and z representing numbers satisfying relations: $0.8 \leq n \leq 1.7$, $2 < x < 3.2$, $y > 0$, $z > 0$ and $y+z=4-n-x$); and (C) a curing agent. The coating composition exhibits excellent storage stability after the curing agent is added, suppresses aggregation of fine silica particles in spray coating and provides coating films having a high hardness and exhibiting excellent weatherability, water resistance, chemical resistance and adhesion.

10 Claims, No Drawings

COATING COMPOSITION

TECHNICAL FIELD

The present invention relates to a coating composition and, more particularly, to a coating composition which can be prepared in accordance with the sol-gel process and provides a coating film having excellent physical properties when the coating composition is applied to the surface of metal, wood, paper, cloth, glass, ceramics, concrete or a synthetic resin by spray coating and cured at a low temperature in the range of the room temperature to about 200° C.

BACKGROUND ART

Heretofore, a coating material forming a coating layer having a high hardness and exhibiting excellent weatherability, water resistance, chemical resistance and adhesion at a low cost has been desired and many proposals have been made. As an inorganic coating material, complexes composed of sols of oxides and organosilanes which provide organo-polysiloxanes by hydrolysis and polycondensation have mainly been examined.

For example, in Japanese Patent Application Laid-Open No. Showa 57(1982)-165429, a coating process using an aqueous composition which contains a dispersion containing colloidal silica in a solution prepared by dissolving a partial condensate of a silanol into a mixture of an aliphatic alcohol and water, a buffered latent catalyst for silanol condensation and a β-hydroxyketone compound is proposed as a process for forming a coating layer which is cured in a short time and provides fastness and scratch resistance to the surface of plastic base materials. In Japanese Patent Application Laid-Open No. Showa 62(1987)-32157, a coating composition prepared by mixing an organoalkoxysilane, an alcohol or a glycol, colloidal alumina, an acid and a filler insoluble in water is proposed as a coating composition for forming a coating layer exhibiting excellent heat resistance on the surface of metal, cement and glass. In these coating compositions, alcohols are added in a great amount as hydrophilic organic solvents and water is contained in a great amount as the dispersion medium of the sol. Therefore, these coating compositions have a drawback in that the concentrations of solid substances is small and, moreover, the rates of hydrolysis and polycondensation are very great and stability in storage is poor.

In Japanese Patent Application Laid-Open No. Showa 63(1988)-117074, a coating composition containing a condensate of an organoalkoxysilane, colloidal silica, water and a hydrophilic organic solvent is proposed as a coating composition which exhibits excellent storage stability and forms a coating layer having a high hardness and exhibiting excellent physical properties on the surface of metal, ceramics and glass. This coating composition has a drawback in that the composition tends to cause condensation of water on the surface due to a decrease in the temperature by vaporization of the hydrophilic organic solvent during spray coating. Aggregation of fine silica particles takes place due to the condensation of water and it is difficult that a uniform coating layer is obtained. In Japanese Patent Application Laid-Open No. Heisei 4 (1992)-175388, a coating composition containing, as the essential components, a solution of an oligomer of an organosilane in which silica is dispersed, a polyorganosiloxane having silanol group in the molecule and a catalyst is proposed as a coating composition which is applied to the surface of metal, concrete and plastic base materials, can be cured at a low temperature and can form a coating layer having a high hardness and exhibiting excellent heat resistance and weatherability. This coating composition has a drawback in that the pot life is short after a curing catalyst is added.

In Japanese Patent Application Laid-Open No. Heisei 3 (1991)-31380, a coating composition containing 30 to 90% by weight of a colloidal silica which has the surface modified with an alkoxysilane compound having 2 or more alkoxyl groups and 70 to 10% by weight of a condensate of an organotrialkoxysilane is proposed as a silicone coating composition which forms a thick coating layer having a high hardness and exhibiting excellent heat resistance, wear resistance, chemical resistance, weatherability and gloss on the surface of metal, ceramics, glass and cement and can be stored for a long time. This coating composition has a drawback in that, since water is added in combination with the alkoxysilane and/or condensates having low molecular weights thereof when the surface of the colloidal silica in this coating composition is modified, hydrolysis and polycondensation of the alkoxysilane and/or the condensates having low molecular weights thereof are promoted in the solution and the efficiency of modification of the surface of the colloidal silica decreases. Moreover, since this coating composition does not contain curing catalysts, it takes a long time before the formed coating film is dried sufficiently so that the coating layer can be touched by hands and, therefore, handling of the coated article is difficult.

The present invention has an object of providing a coating composition which exhibits excellent storage stability after addition of a curing agent, suppresses aggregation of fine silica particles during spray coating and forms a coating layer having a high hardness and exhibiting excellent weatherability, water resistance, chemical resistance and adhesion.

DISCLOSURE OF THE INVENTION

As the result of intensive studies by the present inventors to overcome the above drawbacks, it was found that a coating composition comprising a dispersion in an alcohol of fine silica particles which had the hydrophobic surface modified with a hydrocarbon group, a solution comprising a silicone oligomer which was obtained by the reaction of an alkoxysilane with water and a curing agent had a long pot life after addition of the curing agent, suppressed aggregation of fine silica particles during spray coating and formed a coating layer exhibiting excellent physical properties. The present invention has been completed base on this knowledge.

The present invention provides:

(1) A coating composition which comprises:

(A) an alcohol dispersion which comprises silica having a hydrophobic surface and dispersed in an alcohol dispersion medium and has a content of silica in a solid substance of 80% by weight or more;

(B) a solution comprising a silicone oligomer which is obtained by a reaction of an alkoxysilane with water and has an average structural unit represented by:

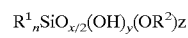

$R^1{}_n SiO_{x/2}(OH)_y(OR^2)z$ wherein $R^1$ represents an alkyl group having 1 to 3 carbon atoms, phenyl group or vinyl group, a plurality of $R^1$ may represent a same group or different groups when the plurality of $R^1$ are present, $R^2$ represents an alkyl group having 1 to 3 carbon atoms, a plurality of $R^2$ may represent a same group or different groups when the plurality of $R^2$ are present and n, x, y and z represent numbers satisfying relations of: $0.8 \leq n \leq 1.7$, $2 < x < 3.2$, $y > 0$, $z > 0$ and $y+z=4-n-x$; and (C) a curing agent;

(2) A coating composition described in (1), wherein a content of component (A) is 10 to 70% by weight as a solid substance and a content of component (B) is 90 to 30% by weight as a solid substance each based on a total amount of component (A) and component (B) as solid substances and a content of component (C) is 1 to 40 parts by weight per 100 parts by weight of a total amount of component (A) and component (B) as solid substances;

(3) A coating composition described in (1), wherein the silica having a hydrophobic surface in component (A) is obtained by a reaction of fine silica particles with an organoalkoxysilane or an organohalosilane each having a structure represented by:

wherein $R^3$ represents an alkyl group having 1 to 3 carbon atoms, phenyl group or vinyl group, m represents 1, 2 or 3, a plurality of $R^3$ may represent a same group or different groups when m represents 2 or 3 and X represents Cl, $OCH_3$ or $OC_2H_5$;

(4) A coating composition described in (1), wherein the silica having a hydrophobic surface in component (A) is obtained by a reaction, in a presence of an amine-based silane coupling agent, of fine silica particles with an organoalkoxysilane having a structure represented by:

wherein $R^3$ represents an alkyl group having 1 to 3 carbon atoms, phenyl group or vinyl group, m represents 1, 2 or 3, a plurality of $R^3$ may represent a same group or different groups when m represents 2 or 3 and X represents $OCH_3$ or $OC_2H_5$;

(5) A coating composition described in (1), wherein the silicone oligomer in component (B) is prepared by using a metal chelate compound as a catalyst;

(6) A coating composition described in (5), wherein a ligand of the metal chelate compound is at least one compound selected from β-diketones and cyclic polyethers having a large ring;

(7) A coating composition described in (1), wherein the silicone oligomer in component (B) is prepared by using, as a self catalyst, a solution comprising a silicon compound which is soluble in a hydrophilic organic solvent and has an average structural unit represented by:

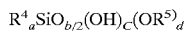

wherein $R^4$ represents an alkyl group having 1 to 3 carbon atoms, phenyl group or vinyl group, a plurality of $R^4$ may represent a same group or different groups when the plurality of $R^4$ are present, $R^5$ represents an alkyl group having 1 to 3 carbon atoms, a plurality of $R^5$ may represent a same group or different groups when the plurality of $R^5$ are present and a, b, c and d represent numbers satisfying relations of: $0 \leq a < 3$, $0 < b < 4$, $c > 0$, $d \geq 0$ and $c+d=4-a-b$;

(8) A coating composition described in (1), wherein component (C) is a solution comprising a complex having a structure represented by:

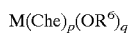

wherein M represents a metal having a valence of 3 or greater, Che represents a chelating agent, $R^6$ represents an alkyl group having 1 to 4 carbon atoms, p represents a number of 1 or greater and q represents a number of 2 or greater; or a polynuclear complex comprising said complex as a basic unit;

(9) A coating composition described in (8), wherein the chelating agent is a β-diketone; and

(10) A coating composition described in (1), wherein component (C) comprises a compound which is selected from carboxylic acids, alcohols having carbonyl group and alcohols having ether group and has a boiling point of 200° C. or lower.

THE MOST PREFERRED EMBODIMENT TO CARRY OUT THE INVENTION

The coating composition of the present invention comprises (A) an alcohol dispersion which comprises silica having the hydrophobic surface and dispersed in an alcohol dispersion medium and has a content of silica in the solid substance of 80% by weight or more, (B) a solution comprising a silicone oligomer which is obtained by the reaction of an alkoxysilane with water and has an average structural unit represented by: $R^1{}_n SiO_{x/2}(OH)_y(OR^2)_z$ and (C) a curing agent. In the above structural formula, $R^1$ represents an alkyl group having 1 to 3 carbon atoms, phenyl group or vinyl group, a plurality of $R^1$ may represent the same group or different groups when the plurality of $R^1$ are present, $R^2$ represents an alkyl group having 1 to 3 carbon atoms, a plurality of $R^2$ may represent the same group or different groups when the plurality of $R^2$ are present and n, x, y and z represent numbers satisfying relations of: $0.8 \leq n \leq 1.7$, $2 < x < 3.2$, $y > 0$, $z > 0$ and $y+z=4-n-x$. The average structural unit means a structural unit of a silicone oligomer averaged and expressed based on one Si atom.

In the present invention, the silica having the hydrophobic surface is silica in the form of fine particles which have the surface covered with an aliphatic, alicyclic or aromatic hydrocarbon group and exhibits a decreased affinity with water. In the composition of the present invention, the process for producing the alcohol dispersion which comprises silica having the hydrophobic surface and used as component (A) is not particularly limited. For example, the alcohol dispersion which comprises silica having the hydrophobic surface of the fine silica particles can be formed by adding an organoalkoxysilane or an organohalosilane to an alcohol sol containing fine silica particles dispersed in an alcohol dispersion medium, reacting the organoalkoxysilane or the organohalosilane with water adsorbed on the fine silica particles and covering the surface of the fine silica particles with a hydrocarbon group to form the hydrophobic surface. Alternatively, the alcohol dispersion which comprises silica having the hydrophobic surface may be formed by covering the surface of the fine silica particles with a hydrocarbon group by reacting an organoalkoxysilane or an organohalosilane with the fine silica particles and, then, the obtained fine silica particles having the hydrophobic surface may be dispersed in an alcohol dispersion medium. It is preferable that the fine silica particles has diameters of 0.5 μm or smaller. The alcohol used as the dispersion medium is not particularly limited. Alcohols having a low boiling point such as methanol, ethanol, n-propanol and isopropanol are preferable since these alcohols vaporize easily during the coating operation.

Fine particles of other oxides such as alumina, titania and zirconia may be used in place of fine particles of silica.

Alcohol dispersions containing the fine particles of these oxides which have the hydrophobic surface formed by the reaction with an organoalkoxysilane or an organohalosilane may be used as component (A). From the standpoint of transparency of the coating film, fine silica particles are preferable as the fine particles of oxides since the fine particles of silica have a refractive index closest to that of the organopolysiloxane which has a low refractive index.

As the alcohol sol in which fine silica particles are dispersed, a commercially available alcohol sol or a dispersion prepared by dispersing fine silica particles having diameters of 0.5 mm or smaller in an alcohol dispersion medium can be used. When an alcohol sol in which fine silica particles are dispersed is used, the surface of the fine silica particles can be made hydrophobic with a hydrocarbon group by the reaction of an organoalkoxysilane or an organohalosilane with water adsorbed on the surface. It is preferable that the organoalkoxysilane or the organohalosilane used above is a compound having a structure represented by $R^3{}_mSiX_{4-m}$. In the formula, $R^3$ represents an alkyl group having 1 to 3 carbon atoms, phenyl group or vinyl group, m represents 1, 2 or 3, a plurality of $R^3$ may represent the same group or different groups when m represents 2 or 3 and X represents Cl, $OCH_3$ or $OC_2H_5$. Examples of the organosilane include trialkoxysilanes such as methyltrimethoxysilane (MTMS), methyltriethoxysilane (MTES), ethyltrimethoxysilane (ETMS), phenyltriethoxysilane (PhTES), vinyltriethoxysilane (VTES), n-propyl-trimethoxysilane (n-PrTMS) and isopropyltrimethoxysilane (iso-PrTMS); dialkoxysilanes such as dimethyldiethoxysilane (DMDE), diphenyldimethoxysilane (DPhDM) and methylethyldimethoxysilane (MEDM); monoalkoxysilanes such as trimethylmethoxysilane (TMMS); and organochlorosilanes such as methyltrichlorosilane, phenyltrichlorosilane, vinyltrichlorosilane, dimethyldichlorosilane, diphenyldichlorosilane and trimethylchlorosilane. The organosilane can be used singly or in combination of two or more.

When the organoalkoxysilane or the organohalosilane is added to the alcohol sol in which fine silica particles are dispersed in an alcohol medium, it is preferable that the organoalkoxysilane or the organohalosilane is used in an amount which is the same as or more than the total amount of water adsorbed on the surface of the fine silica particles and water contained in the alcohol dispersion medium in a small amount. When the reaction is conducted, it is preferable that care is taken as much as possible not to have water mixed into the dispersion medium. When water is present in the dispersion medium in an excess amount, hydrolysis and polycondensation of the organoalkoxysilane or the organohalosilane is promoted and the effect of forming the hydrophobic surface on the fine silica particles is adversely affected. It is preferable that an amine-based silane coupling agent is added to component (A) in an amount of 0.1% by weight or less so that the reaction for forming the hydrophobic surface on the fine silica particles is promoted. The amine-based silane coupling agent used above is not particularly limited. Examples of the silane coupling agent include N-β-aminoethyl-γ-aminopropyltrimethoxysilane, N-β-aminoethyl-γ-aminopropylmethyl-dimethoxysilane and γ-aminopropyltriethoxysilane. When the amine-based silane coupling agent is added, it is preferable that an organoalkoxysilane is used as the agent for forming the hydrophobic surface on the fine silica particles.

In the composition of the present invention, the content of silica in the solid substance is 80% by weight or more and preferably 85% or more in component (A). The silica in the solid substance means silica contained in the alcohol sol before the organoalkoxysilane or the organohalosilane is added. Silicon atoms bonded to the hydrocarbon group which are derived from the organoalkoxysilane or the organohalosilane are not include in the silica in the solid substance. When the amount of silica in the solid substance is less than 80% by weight, the relative amount of the hydrophobic layer on the surface of the fine silica particles increases. As the result, unreacted alkoxyl groups and chlorine are left remaining in a great amount and there is the possibility that the quality of the coating layer is adversely affected.

In the composition of the present invention, the fine silica particles can be incorporated uniformly into the coating layer composed of an organopolysiloxane due to the hydrophobic surface of the fine silica particles and a coating film having a high hardness and a great mechanical strength and exhibiting excellent chemical durability can be obtained.

Component (B) used in the present invention is a solution comprising a silicone oligomer which is obtained by a reaction of an alkoxysilane with water and has an average structural unit represented by $R^1{}_nSiO_{x/2}(OH)_y(OR^2)_z$. In the formula, $R^1$ represents an alkyl group having 1 to 3 carbon atoms, phenyl group or vinyl group, a plurality of $R^1$ may represent the same group or different groups when the plurality of $R^1$ are present, $R^2$ represents an alkyl group having 1 to 3 carbon atoms, a plurality of $R^2$ may represent the same group or different groups when the plurality of $R^2$ are present and n, x, y and z represent numbers satisfying relations of: $0.8 \leq n \leq 1.7$ and preferably $1 \leq n \leq 1.3$, $2 < x < 3.2$ and preferably $2 < x < 3$, $y > 0$, $z > 0$ and $y + z = 4 - n - x$. When the number represented by n is smaller than 0.8, it is difficult that stress is relaxed during drying the coating film and there is the possibility that cracks are formed in the coating film. When the number represented by n exceeds 1.7, the formation of a three-dimensional network structure tends to be difficult and there is the possibility that mechanical properties of the coating film deteriorates. When the number represented by x is smaller than 2, the formation of a linear polymer tends to be difficult and there is the possibility that the amount of volatile component increases. When the number represented by x exceeds 3.2, the relaxation of stress during drying the coating film tends to be difficult and there is the possibility that cracks are formed in the coating film. Since hydroxyl group in the silicone oligomer becomes the crosslinking points in the crosslinking by the action of the curing agent, the presence of hydroxyl group is essential. The presence of the alkoxyl group represented by $OR^2$ is essential for maintaining the storage stability of the solution before the addition of the curing agent.

The alkoxysilane used for the preparation of component (B) is not particularly limited. Examples of the alkoxysilane include tetraalkoxysilanes such as tetramethoxysilane (TMOS) and tetraethoxy-silane (TEOS); trialkoxysilanes such as methyltrimethoxysilane (MTMS), methyltriethoxysilane (MTES), ethyltrimethoxysilane (ETMS), phenyltriethoxysilane (PhTES), vinyltriethoxysilane (VTES), n-propyl-trimethoxysilane (n-PrTMS) and isopropyltrimethoxysilane (iso-PrTMS); dialkoxysilanes such as dimethyldiethoxysilane (DMDE), diphenyldimethoxysilane (DPhDM) and methylethyldimethoxysilane (MEDM); and monoalkoxysilanes such as trimethylmethoxysilane (TMMS).

In the preparation of component (B) used in the present invention, it is preferable that water and the alkoxysilane are mixed in amounts such that the ratio of the amount by mole of $H_2O$ to the amount by mole of Si is in the range of 1.4 to 4.0 and more preferably in the range of 1.4 to 2.5 and the hydrolysis and the polycondensation are conducted. When the ratio of the amount by mole of $H_2O$ to the amount by mole of Si is smaller than 1.4, there is the possibility that the unreacted alkoxyl group is left remaining in a great amount and the amount of the oligomer having high molecular weights decreases. Therefore, there is the possibility that mechanical property of the coating film are adversely affected. When the ratio of the amount by mole of $H_2O$ to the amount by mole of Si exceeds 4.0, water tends to be condensed on the surface during the spray coating and there is the possibility that formation of a uniform coating film becomes difficult during the film formation. When the ratio of the amount by mole of $H_2O$ to the amount by mole of Si is adjusted within the range of 1.4 to 4.0, a portion of the alkoxyl group remains and the effect of improving the stability of the solution containing the silicon oligomer of component (B) is exhibited.

In the preparation of component (B) of the composition of the present invention, it is preferable that an acid catalyst conventionally used for the sol-gel reaction is not used as the catalyst for the hydrolysis but, instead, a metal chelate compound is used as the catalyst for the hydrolysis. When the acid catalyst is used, there is the possibility that gel tends to be formed. The metal chelate compound used as the catalyst for the hydrolysis exhibits not only the catalytic effect on the hydrolysis of alkoxide but also the effect of suppressing crystallization when a methyltrialkoxysilane is used in a great amount as the raw material. Moreover, the metal chelate compound exhibits the effect of promoting linear propagation of the polycondensation by deprotonation of the silanol in addition to the catalytic effect on the hydrolysis. Therefore, the obtained liquid has excellent storage stability for a long time and the use of the metal chelate compound is advantageous for the formation of a coating film. The metal chelate compound is not particularly limited. Metal chelate compounds having β-diketones or cyclic polyethers having a large ring as the ligands can be preferably used. The type of the metal ion is not particularly limited. Metal ions having a great constant of complex formation with the ligand are preferably used.

Examples of the metal chelate compound include metal chelate compounds of β-diketones such as tris(acetylacetonato)aluminum(III), tris(ethyl acetoacetato)aluminum(III), tris(diethyl malonato)aluminum(III) bis(acetylacetonato)copper(II), tetrakis(acetylacetonato)zirconium-(IV), tris(acetylacetonato)chromium(III), tris(acetylacetonato)cobalt(III) and titanium(II) oxyacetylacetonate [$(CH_3COCHCOCH_3)_2TiO$]; metal chelate compounds of β-diketones with rare earth metals; and metal chelate compounds of cyclic polyethers having a large ring such as 18-crown-6-potassium chelate compound salts, 12-crown-4-lithium chelate compound salts and 15-crown-5-sodium chelate compound salts.

The amount of the metal chelate compound is not particularly limited and can be suitably selected in accordance with the catalytic effect. In general, it is preferable that the amount is 0.001 to 5% by mole and more preferably 0.005 to 1% by mole based on the amount of the alkoxysilane. When the amount of the metal chelate compound is less than 0.001% by mole based on the amount of the alkoxysilane, there is the possibility that the catalytic effect on the hydrolysis is not exhibited sufficiently. When the amount of the metal chelate compound exceeds 5% by mole based on the amount of the alkoxysilane, there is the possibility that the metal chelate compound is precipitated during the formation of a coating film and the properties of the coating film are adversely affected. When a self-catalyst is used, the amount of the metal chelate compound include the amount of the metal chelate compound derived from the self-catalyst.

In the preparation of component (B) of the composition of the present invention, the alkoxysilane may be hydrolyzed and polycondensed by using a solution comprising a silicon compound which has an average structural unit represented by $R^4{}_a SiO_{b/2}(OH)_c(OR^5)_d$ and is soluble in a hydrophilic organic solvent as a self catalyst. In the formula, $R^4$ represents an alkyl group having 1 to 3 carbon atoms, phenyl group or vinyl group, a plurality of $R^4$ may represent the same group or different groups when the plurality of $R^4$ are present, $R^5$ represents an alkyl group having 1 to 3 carbon atoms, a plurality of $R^5$ may represent the same group or different groups when the plurality of $R^5$ are present and a, b, c and d represent numbers satisfying relations of: $0 \leq a < 3$ and preferably $0.8 \leq a < 2$, $0 < b < 4$ and preferably $1 < b < 3$, $c > 0$, $d < 0$ and $c + d = 4 < a < b$. The average structural unit means a structural unit of a silicon compound averaged and expressed based on one Si atom. When the number represented by a exceeds 3, the above silicon compound tend to be vaporized and there is the possibility that the silicon compound is condensed and deactivated. When the number represented by c is greater than 0 and the silanol group is present, the hydrolysis of the alkoxysilane with water is promoted and polycondensation is also promoted due to protonation of the alkoxysilane with proton in the silanol. The silicone oligomer itself in the solution of a silicon oligomer which is the product of the hydrolysis and the polycondensation of the alkoxysilane can be the above silicon compound having the above average structural unit represented by $R^4{}_a SiO_{b/2}(OH)_c(OR^5)_d$ which is used as the catalyst for the reaction. Therefore, this type of the catalyst is defines as a self-catalyst. It is preferable that the added amount of the self-catalyst is in the range of 0.1 to 50% by weight and more preferably in the range of 1 to 40% by weight based on the amount of the alkoxysilane. When the added amount of the self-catalyst is less than 0.1% by weight based on the amount of the alkoxysilane, the amount of transfer of proton is small and there is the possibility that the efficiency of the hydrolysis decreases. When the added amount of the self-catalyst exceeds 50% by weight based on the amount of the alkoxysilane, the amount of the silicone oligomer derived from the catalyst increases in the solution of the silicone oligomer obtained by the reaction and there is the possibility that the efficiency of production of the silicone oligomer decreases. Moreover, there is the possibility that the quality of the obtained solution of the silicone oligomer becomes unstable.

When the solution of the self-catalyst is prepared from the alkoxysilane, it is preferable that at least one compound selected from acids and metal chelate compounds is added as the catalyst. As the acid, an acid conventionally used in the sol-gel reaction, for example, an a inorganic acid such as nitric acid and hydrochloric acid and an organic acid such as acetic acid, can be used. When a coating film is formed on the surface of a metal base material, it is preferable that a catalyst of a metal chelate compound is used so that corrosion at the interface is suppressed. When a great amount of the self-catalyst is added in the preparation of the solution of the silicone oligomer of the present invention, it is preferable that a catalyst of a metal chelate compound is used since there is the possibility that the use of an acid catalyst causes deterioration in the storage stability.

A fresh solution of the self-catalyst can be prepared by hydrolysis and polycondensation of an alkoxysilane using the solution of the self-catalyst thus obtained as the catalyst. In this case, it is preferable that a catalyst of a metal chelate compound is used in combination.

The alkoxysilane used for the preparation of the solution of a self-catalyst is not particularly limited. Examples of the alkoxysilane include tetraalkoxysilanes such as tetramethoxy-silane (TMOS) and tetraethoxysilane (TEOS); trialkoxysilanes such as methyltrimethoxysilane (MTMS), methyltriethoxysilane (MTES), ethyltrimethoxysilane (ETMS), phenyl-triethoxysilane (PhTES), vinyltriethoxysilane (VTES), n-propyl-trimethoxysilane (n-PrTMS) and iso-propyltrimethoxysilane (iso-PrTMS); dialkoxysilanes such as dimethyldiethoxysilane (DMDE), diphenyl-dimethoxysilane (DPhDM) and methylethyldimethoxysilane (MEDM); and monoalkoxysilanes such as trimethyl-methoxysilane (TMMS).

The catalyst of a metal chelate compound used for preparation of the solution of a self-catalyst is not particularly limited. Metal chelate compounds having β-diketones and cyclic polyethers having a large ring can be preferably used. The type of the metal ion is not particularly limited. Metal ions having a great constant of complex formation with the ligand can be preferably used. Examples of the metal chelate compound include metal chelate compounds of β-diketones such as tris(acetylacetonato)aluminum(III), tris(ethyl acetoacetato)aluminum(III), tris(diethyl malonato) aluminum(III), bis(acetylacetonato)copper(II), tetrakis (acetylacetonato)zirconium(IV), tris(acetylacetonato) chromium(III), tris (acetylacetonato)cobalt(III) and titanium (II) oxyacetylacetonate [$(CH_3COCHCOCH_3)_2TiO$]; metal chelate compounds of μ-diketones with rare earth metals; and metal chelate compounds of cyclic polyethers having a large ring such as 18-crown-6-potassium chelate compound salts, 12-crown-4-lithium chelate compound salts and 15-crown-5-sodium chelate compound salts.

The amount of the catalyst of the metal chelate compound added in the preparation of the solution of the self-catalyst is not particularly limited and can be suitably selected in accordance with the catalytic effect. In general, it is preferable that the amount is 0.001% by mole or more and more preferably 0.005% by mole or more based on the amount of the alkoxysilane. When the amount of the metal chelate compound is less than 0.001% by mole based on the amount of the alkoxysilane, there is the possibility that the catalytic effect on the hydrolysis is not exhibited sufficiently. There is no upper limit in the amount of the catalyst of the metal chelate compound based on the amount of the alkoxysilane as long as the metal chelate compound is homogeneously dissolved.

In the composition of the present invention, a major portion of the solvent of the solution comprising the silicone oligomer of component (B) is the alcohol formed by the hydrolysis of the alkoxysilane. Preparation of the solution of the silicone oligomer which is stable and has a high concentration of solid substances is made possible by utilizing the alcohol formed by the hydrolysis without adding other solvents. In the composition of the present invention, the molecular weight of the silicone oligomer is not particularly limited. A silicone oligomer having a high molecular weight can be used as long as the silicone oligomer formed by hydrolysis and polycondensation of the alkoxysilane is dissolved into the alcohol formed simultaneously and a homogeneous solution is formed.

In the composition of the present invention, it is preferable that the curing agent used as component (C) is a solution comprising a complex having the structure represented by $M(Che)_p(OR^6)_q$ or a polynuclear complex comprising the above complex as a basic unit. In the above formula, M represents a metal having a valence of 3 or greater, Che represents a chelating agent, $R^6$ represents an alkyl group having 1 to 4 carbon atoms, p represents a number of 1 or greater and q represents a number of 2 or greater. In the composition of the present invention, the curing agent of component (C) is added to a mixture of component (A) and component (B) before the coating composition is used for the coating and exhibits the effect of promoting crosslinking in the process of formation of the coating film. The metal ion having a valence of 3 or greater which is represented by M is not particularly limited. Examples of the metal ion having a valence of 3 or greater include $Al^{3+}$, $Ti^{4+}$ and $Zr^{4+}$. Examples of the reactive functional group represented by $OR^6$ include methoxyl group, ethoxyl group, n-propoxyl group, isopropoxyl group, n-butoxyl group, secbutoxyl group and tert-butoxyl group. When the number represented by q is 2 or greater, i.e., when the number of the reactive group represented by $OR^6$ is 2 or greater, the curing agent exhibits the effect of promoting the crosslinking and a further effect of forming the crosslinking with the reactive group itself. The chelating agent represented by Che is not particularly limited. Examples of the chelating agent include acetylacetone, ethyl acetoacetate and diethyl malonate.

In the composition of the present invention, it is preferable that the curing agent of component (C) comprises a compound which is selected from carboxylic acids, alcohols having carbonyl group and alcohols having ether group and has a boiling point of 200° C. or lower and preferably 170° C. or lower. Examples of the above compound include carboxylic acids such as formic acid, acetic acid, propionic acid, butyric acid, isobutyric acid, valeric acid, isovaleric acid, acrylic acid, isocrotonic acid and methacrylic acid; β-hydroxyketone compounds such as diacetone alcohol; alcohols having carbonyl group such as ethylene glycol monoacetate; alcohols having ether group such as ethylene glycol monomethyl ether, ethylene glycol monoethyl ether, 2-(methoxymethoxy)ethanol, ethylene glycol monoisopropyl ether, propylene glycol monomethyl ether and propylene glycol monoethyl ether. The above compound can be used singly or in combination of two or more.

When the curing agent comprises a carboxylic acid, an alcohol having carbonyl group or an alcohol having ether group, this compound acts as a stabilizer and the pot life of the coating composition comprising component (A), component (B) and component (C) increases to facilitate handling. This compound exchanges the ligand with the group represented by $OR^6$ in the compound represented by $M(Che)_p(OR^6)_q$ which is the component of the curing agent. The stability of the curing agent is improved by forming a partially chelated metal complex and, as the result, the stability of the coating composition is improved. On the other hand, after the coating composition is applied and a coating film is formed, the compound with which the ligand has been exchanged is removed and the effect of promoting curing after the formation of the coating film does not decrease. In this manner, a uniform coating film having excellent mechanical properties can be obtained. It is preferable that this compound is added in an amount of 0.5 moles or more per 1 mole of the metal represented by M. It is preferable that the curing is conducted at a temperature in the range of the room temperature to 200° C.

In the coating composition of the present invention, it is preferable that the content of component (A) is 10 to 70% by weight as a solid substance and the content of component (B) is 90 to 30% by weight as a solid substance each based on the total amount of component (A) and component (B) as solid substances. When the content of component (A) as a solid substance is smaller than 10% by weight or the content of component (B) as a solid substance exceeds 90% by weight based on the total amount of component (A) and component (B), there is the possibility that hardness and mechanical strength of the coating film decrease. When the content of component (A) as a solid substance exceeds 70% by weight or the content of component (B) as a solid substance is smaller than 30% by weight based on the total amount of component (A) and component (B), there is the possibility that the coating film becomes fragile due to the excessively small content of the organopolysiloxane as the binder of the fine silica particles. It is more preferable that the content of component (A) is 15 to 60% by weight as a solid substance and the content of component (B) is 85 to 40% by weight as a solid substance each based on the total amount of component (A) and component (B) as solid substances.

In the coating composition of the present invention, it is preferable that the content of component (C) is 1 to 40 parts by weight per 100 parts by weight of the total amount of component (A) and component (B) as solid substances. When the content of component (C) is smaller than 1 part by weight per 100 parts by weight of the total amount of component (A) and component (B) as solid substances, there is the possibility that curing after the coating becomes insufficient. When the content of component (C) exceeds 40 part by weight per 100 parts by weight of the total amount of component (A) and component (B) as solid substances, there is the possibility that the pot life of the coating composition obtained by mixing component (A), component (B) and component (C) is short and there is the possibility that problems arise in the operation. It is more preferable that the content of component (C) is 2 to 25 parts by weight per 100 parts by weight of the total amount of component (A) and component (B) as solid substances.

The process for application of the coating composition of the present invention is not particularly limited and any conventional coating process can be selected in accordance with the shape of the coated article and the object of the coating. For example, any of the spray coating process, the dipping coating process, the flow coating process and the roll coating process can be selected. The thickness of the coating film can be selected in accordance with the object of coating. In general, it is preferable that the thickness is in the range of 1 to 50 μm.

The coating composition of the present invention is applied to inorganic base materials such as metal, glass, ceramics and concrete and organic base materials such as acrylic resins, ABS resins, wood and paper to protect the surface of the base materials and enhance the excellent appearance.

EXAMPLES

The present invention will be described more specifically with reference to examples in the following. However, the present invention is not limited to the examples.

In the examples, the evaluations of coating compositions and coating films were conducted in accordance with the following methods. For the evaluation of a coating film, a coating film having a pencil scratch value of 3H or greater was used.

(1) Pencil Scratch Value

The pencil scratch value of a coating film formed on a steel plate was evaluated in accordance with the method of Japanese Industrial Standard K5400 8.4.2.

(2) Water Permeability

The water permeability of a coating film formed on a cement board was evaluated in accordance with the method of Japanese Industrial Standard K5400 8.16.

(3) Acid Resistance

The acid resistance of a coating film formed on a steel plate was evaluated in accordance with the method of Japanese Industrial Standard K5400 8.22 by dipping into a 5% by weight/volume sulfuric acid kept at 50° C. for 15 hours.

(4) Flexibility

The flexibility of a coating film formed on a steel plate was evaluated in accordance with the method of Japanese Industrial Standard K5400 8.1 using a stem having a diameter of 6 mm.

(5) Resistance to Repeated Cooling and Heating

The resistance to repeated cooling and heating of a coating film formed on a steel plate was evaluated in accordance with the method of Japanese Industrial Standard K5400 9.3 under repeated cooling and heating of 4 cycles, each cycle being 120° C.×1 hour and −10° C.×1 hour.

(6) Water Resistance

The water resistance of a coating film formed on a glass plate was evaluated in accordance with the method of Japanese Industrial Standard K5400 8.19 by dipping into deionized water kept at 60° C. for 7 days.

(7) Moisture Resistance

The moisture resistance of a coating film formed on a steel plate was evaluated in accordance with the method of Japanese Industrial Standard K5400 9.2.1 for 7 days.

(8) Adhesion

The adhesion of a coating film formed on a steel plate was evaluated in accordance with the method of Japanese Industrial Standard K5400 8.5.3.

(9) Weatherability Under an Accelerating Condition

The weatherability of a coating film formed on a steel plate under an accelerating condition was evaluated in accordance with the method of Japanese Industrial Standard K5400 9.8.1 for 500 hours.

(10) Storage Stability

A coating composition in an amount of 300 g prepared by mixing prescribed amounts of component (A), component (B) and component (C) was placed into a glass container of 500 ml. The glass container containing the composition was sealed and placed into a chamber kept at 25° C. The storage stability was evaluated from the time by day during which fluidity of the coating composition was maintained.

Preparation Example 1

Preparation of a Dispersion of Silica Having the Hydrophobic Surface in an Alcohol)

To 100 parts by weight of silica sol containing isopropyl alcohol as the dispersion medium [manufactured by NISSAN CHEMICAL INDUSTRIES, Ltd.; IPA-ST; the solid content: 30% by weight], 10 parts by weight of methyltriethoxysilane [manufactured by SHIN-ETSU CHEMICAL Co., Ltd.; LS-1890] was mixed. The resultant mixture was left standing at 25° C. for 1 day and dispersion A-1 of silica having the hydrophobic surface in isopropyl alcohol was obtained. The surface of the fine powder of silica was made hydrophobic with methyl group. The content of silica in the solid substance of this dispersion was 89% by weight.

Preparation Example 2

Preparation of a Dispersion of Silica Having the Hydrophobic Surface in an Alcohol To 100 parts by weight of silica sol containing isopropyl alcohol as the dispersion medium [manufactured by NIS- SAN CHEMICAL INDUSTRIES, Ltd.; IPA-ST; the solid content: 30% by weight], 5 parts by weight of methyltriethoxysilane [manufactured by SHIN-ETSU CHEMICAL Co., Ltd.; LS-1890] was mixed. The resultant mixture was left standing at 25° C. for 1 day and dispersion A-2 of silica having the hydrophobic surface in isopropyl alcohol was obtained. The surface of the fine powder of silica was made hydrophobic with methyl group. The content of silica in the solid substance of this dispersion was 94% by weight.

Preparation Example 3

Preparation of a Dispersion of Silica Having the Hydrophobic Surface in an Alcohol Fine silica particles having an average diameter of 0.1 mm in an amount of 100 parts by weight was dispersed into 100 parts by weight of a toluene solution containing 10% by weight of methyltrichlorosilane [manufactured by SHIN-ETSU CHEMICAL Co., Ltd.; LS-40] and the formed gas of hydrochloric acid was neutralized with aqueous ammonia. Toluene was removed by distillation using an evaporator. After drying the residue, 102 parts by weight of fine silica particles having the hydrophobic surface was obtained. The obtained fine particles in an amount of 30 parts by weight was dispersed in 70 parts by weight of isopropyl alcohol and dispersion A-3 of silica having the hydrophobic surface in isopropyl alcohol was obtained. The surface of the fine powder of silica was made hydrophobic with methyl group. The content of silica in the solid substance of this dispersion was 98% by weight.

Preparation Example 4

Preparation of a Dispersion of Silica Having the Hydrophobic Surface in an Alcohol To 100 parts by weight of silica sol containing isopropyl alcohol as the dispersion medium [manufactured by NISSAN CHEMICAL INDUSTRIES, Ltd.; IPA-ST; the solid content: 30% by weight], 5 parts by weight of methyltriethoxysilane [manufactured by SHIN-ETSU CHEMICAL Co., Ltd.; LS-1890] and 0.05 parts by weight of y-aminopropyltriethoxysilane [manufactured by SHIN-ETSU CHEMICAL Co., Ltd.; KBE903] were mixed. The resultant mixture was left standing at 25° C. for 1 day and dispersion A-4 of silica having the hydrophobic surface in isopropyl alcohol was obtained. The surface of the fine powder of silica was made hydrophobic with methyl group. The content of silica in the solid substance of this dispersion was 94% by weight.

Preparation Example 5

Preparation of a Solution of a Silicone Oligomer

To 100 parts by weight of methyltriethoxysilane [manufactured by SHIN-ETSU CHEMICAL Co., Ltd.; LS-1890], 0.02 parts by weight of tris(acetylacetonato) aluminum(III) [manufactured by DOJIN KAGAKU KENKYUSHO Co., Ltd.] was added. The reaction was allowed to proceed in the resultant solution at 50° C. for 1 day while 18 parts by weight of distilled water was added to the solution and transparent solution B-1 of a silicone oligomer was obtained. The solid content of this solution of the silicone oligomer was 32% by weight.

Preparation Example 6

Preparation of a Solution of a Silicone Oligomer

To a mixture of 100 parts by weight of methyltriethoxysilane [manufactured by SHIN-ETSU CHEMICAL Co., Ltd.; LS-1890] and 83 parts by weight of dimethyldiethoxysilane [manufactured by SHIN-ETSU CHEMICAL Co., Ltd.; LS-1370], 0.04 parts by weight of tris-(acetylacetonato)aluminum(III) [manufactured by DOJIN KAGAKU KENKYUSHO Co., Ltd.] was added. The reaction was allowed to proceed in the resultant solution at 50° C. for 1 day while 30 parts by weight of distilled water was added to the solution and transparent solution B-2 of a silicone oligomer was obtained. The solid content of this solution of the silicone oligomer was 37% by weight.

Preparation Example 7

Preparation of a Solution of a Silicone Oligomer

To a mixed solution of 100 parts by weight of methyltriethoxysilane [manufactured by SHIN-ETSU CHEMICAL Co., Ltd.; LS-1890] and 25 parts by weight of ethanol, 0.06 parts by weight of tris(acetylacetonato)-aluminum(III) [manufactured by DOJIN KAGAKU KENKYUSHO Co., Ltd.] was added. The resultant mixture was stirred at the room temperature for 30 minutes and tris(acetylacetonato) aluminum(III) was dissolved. Then, 18 parts by weight of distilled water was added to the resultant solution over 1 hour while the solution was stirred. The resultant solution was then left standing at the room temperature for 1 day and the obtained solution was used as self-catalyst A.

To 100 parts by weight of methyltriethoxysilane [manufactured by SHIN-ETSU CHEMICAL Co., Ltd.; LS-1890], 28 parts by weight of self-catalyst A prepared above was added and then 0.02 parts by weight of tris (acetylacetonato)aluminum(III) [manufactured by DOJIN KAGAKU KENKYUSHO Co., Ltd.] was added. The resultant mixture was stirred at the room temperature for 30 minutes and tris(acetylacetonato)-aluminum(III) was dissolved. Then, 18 parts by weight of distilled water was added to the resultant solution over 1 hour while the solution was stirred. The resultant solution was left standing at the room temperature for 1 day and homogeneous solution B-3 of a silicone oligomer was obtained. The solid content of this solution of the silicone oligomer was 31% by weight.

Preparation Example 8

Preparation of a Curing Agent

With 100 parts by weight of aluminum tri-sec-butoxide [manufactured by KANTO KAGAKU Co., Ltd.], 40.5 parts by weight of acetylacetone, 50 parts by weight of acetic acid and 200 parts by weight of ethanol were mixed and curing agent C-1 was obtained.

Preparation Example 9

Preparation of a Curing Agent

With 100 parts by weight of aluminum tri-sec-butoxide [manufactured by KANTO KAGAKU Co., Ltd.], 40.5 parts by weight of acetylacetone and 240 parts by weight of diacetone alcohol were mixed and curing agent C-2 was obtained.

Preparation Example 10

Preparation of a Curing Agent

With 100 parts by weight of titanium tetra-n-butoxide [manufactured by KANTO KAGAKU Co., Ltd.], 29.4 parts by weight of acetylacetone, 9 parts by weight of acetic acid and 170 parts by weight of ethylene glycol monomethyl ether were mixed and curing agent C-3 was obtained.

Example 1

Dispersion A-1 of silica having the hydrophobic surface in isopropyl alcohol in an amount of 20 parts by weight, 80 parts by weight of solution B-1 of a silicone oligomer and 4 parts by weight of curing agent C-1 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 8 $\mu$m were formed. A transparent coating film having gloss was obtained on each plate.

After the coating film was left standing at the room temperature for 2 days, the pencil scratch value was found to be H and, after the coating film was further heated at 80° C. for 1 hour, the pencil scratch value was found to be 5H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 7 days. On the eighth day, gel was formed and the fluidity was lost.

Example 2

Dispersion A-1 of silica having the hydrophobic surface in isopropyl alcohol in an amount of 50 parts by weight, 50 parts by weight of solution B-1 of a silicone oligomer and 3 parts by weight of curing agent C-1 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 8 $\mu$m were formed. A transparent coating film having gloss was obtained on each plate.

After the coating film was left standing at the room temperature for 2 days, the pencil scratch value was found to be 2H and, after the coating film was further cured at the room temperature for 1 month, the pencil scratch value was found to be 6H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 10 days. On the eleventh day, gel was formed and the fluidity was lost.

Example 3

Dispersion A-1 of silica having the hydrophobic surface in isopropyl alcohol in an amount of 20 parts by weight, 80 parts by weight of solution B-1 of a silicone oligomer and 4 parts by weight of curing agent C-2 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 5 $\mu$m were formed. A transparent coating film having gloss was obtained on each plate.

After the coating film was left standing at the room temperature for 2 days, the pencil scratch value was found to be 4H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 5 days. On the sixth day, gel was formed and the fluidity was lost.

Example 4

Dispersion A-2 of silica having the hydrophobic surface in isopropyl alcohol in an amount of 20 parts by weight, 80 parts by weight of solution B-1 of a silicone oligomer and 4 parts by weight of curing agent C-2 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 6 $\mu$m were formed. A transparent coating film having gloss was obtained on each plate.

After the coating film was left standing at the room temperature for 2 days, the pencil scratch value was found to be 4H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed.

In the test of the adhesion, no cleavage was observed at all. In the accelerated test of the weatherability, no discoloration or formation of cracks was observed. In the test of the storage stability, no change in the fluidity was observed for 5 days. On the sixth day, gel was formed and the fluidity was lost.

Example 5

Dispersion A-1 of silica having the hydrophobic surface in isopropyl alcohol in an amount of 50 parts by weight, 50 parts by weight of solution B-2 of a silicone oligomer and 5 parts by weight of curing agent C-2 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 20 μm were formed. A transparent coating film having gloss was obtained on each plate.

After the coating film was left standing at the room temperature for 2 days, the pencil scratch value was found to be H and, after the coating film was further heated at 80° C. for 1 hour, the pencil scratch value was found to be 3H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 10 days. On the eleventh day, gel was formed and the fluidity was lost.

Example 6

Dispersion A-2 of silica having the hydrophobic surface in isopropyl alcohol in an amount of 50 parts by weight, 50 parts by weight of solution B-1 of a silicone oligomer and 5 parts by weight of curing agent C-3 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 15 μm were formed. A transparent coating film having gloss was obtained on each plate.

After the coating film was left standing at the room temperature for 2 days, the pencil scratch value was found to be 2H and, after the coating film was further heated at 80° C. for 1 hour, the pencil scratch value was found to be 7H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 10 days. On the eleventh day, gel was formed and the fluidity was lost.

Example 7

Dispersion A-3 of silica having the hydrophobic surface in isopropyl alcohol in an amount of 50 parts by weight, 50 parts by weight of solution B-1 of a silicone oligomer and 5 parts by weight of curing agent C-3 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 15 μm were formed. A translucent coating film having gloss was obtained on each plate.

After the coating film was left standing at the room temperature for 2 days, the pencil scratch value was found to be 2H and, after the coating film was further heated at 80° C. for 1 hour, the pencil scratch value was found to be 7H. The water permeability was 10 ml/m$^2$.day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 10 days. On the eleventh day, gel was formed and the fluidity was lost.

Example 8

Dispersion A-1 of silica having the hydrophobic surface in isopropyl alcohol in an amount of 20 parts by weight, 80 parts by weight of solution B-3 of a silicone oligomer and 4 parts by weight of curing agent C-3 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 12 μm were formed. A transparent coating film having gloss was obtained on each plate.

After the coating film was left standing at the room temperature for 2 days, the pencil scratch value was found to be H and, after the coating film was further heated at 80° C. for 1 hour, the pencil scratch value was found to be 5H.

The water permeability was 10 ml/m².day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 8 days. On the ninth day, gel was formed and the fluidity was lost.

Example 9

Dispersion A-4 of silica having the hydrophobic surface in isopropyl alcohol in an amount of 50 parts by weight, 50 parts by weight of solution B-1 of a silicone oligomer and 5 parts by weight of curing agent C-3 were mixed together and a coating composition was obtained. The obtained coating composition was applied to steel plates (the thickness: 0.3 mm and 0.8 mm), an aluminum plate, a glass plate (the thickness: 2 mm), a cement board (the thickness: 8 mm) and a methacrylic resin plate in accordance with the spray coating process and coating films each having a thickness of 12 μm were formed. A transparent coating film having gloss was obtained on each plate.

After the coating film was left standing at the room temperature for 2 days, the pencil scratch value was found to be 2H and, after the coating film was further heated at 80° C. for 1 hour, the pencil scratch value was found to be 7H.

The water permeability was 10 ml/m².day or smaller. In the test of the acid resistance, no crack, cleavage, hole, softening or rust was observed. The dipping solution showed no coloring or turbidity and the coating film exhibited no change in the gloss after the test. In the test of the flexibility, no crack or cleavage was observed. In the test of the repeated cooling and heating, no crack, cleavage, swelling or whitening was observed. In the test of the water resistance, no wrinkle, swelling, crack, cleavage, change in gloss, clouding, whitening or discoloration was observed. In the test of the moisture resistance, no wrinkle, swelling, crack, rust, cleavage, clouding or whitening was observed. In the test of the adhesion, no cleavage was observed at all. In the accelerated test of the weatherability, no discoloration or formation of cracks was observed. In the test of the storage stability, no change in the fluidity was observed for 9 days. On the tenth day, gel was formed and the fluidity was lost.

Comparative Example 1

A silica sol in isopropyl alcohol as the dispersion medium [manufactured by NISSAN CHEMICAL INDUSTRIES, Ltd.; IPA-ST; solid content: 30% by weight] in an amount of 40 parts by weight, 60 parts by weight of solution B-1 of a silicone oligomer and 3 parts by weight of curing agent C-1 were mixed together and a coating composition was obtained. The obtained coating composition was applied to a steel plate (the thickness: 0.8 mm) in accordance with the spray coating process. Numerous grains were observed on the surface and no uniform coating film was obtained. Therefore, evaluations of the coating film was not conducted.

The results of Examples 1 to 9 and Comparative Example 1 are shown in Table 1.

TABLE 1-1

|  | Curing condition | Pencil scratch value | Water permeability (ml/m²·day) | Acid resistance | Flexibility |
| --- | --- | --- | --- | --- | --- |
| Example 1 | room temp. × 2 days | H | <10 | good | good |
|  | 80° C. × 1 hour | 5 H |  |  |  |
| Example 2 | room temp. × 2 days | 2 H | <10 | good | good |
|  | room temp. × 1 month | 6 H |  |  |  |
| Example 3 | room temp. × 2 days | 4 H | <10 | good | good |
| Example 4 | room temp. × 2 days | 4 H | <10 | good | good |
| Example 5 | room temp. × 2 days | H | <10 | good | good |
|  | 80° C. × 1 hour | 3 H |  |  |  |
| Example 6 | room temp. × 2 days | 2 H | <10 | good | good |
|  | 80° C. × 1 hour | 7 H |  |  |  |
| Example 7 | room temp. × 2 days | 2 H | <10 | good | good |
|  | 80° C. × 1 hour | 7 H |  |  |  |
| Example 8 | room temp. × 2 days | H | <10 | good | good |
|  | 80° C. × 1 hour | 5 H |  |  |  |
| Example 9 | room temp. × 2 days | 2 H | <10 | good | good |
|  | 80° C. × 1 hour | 7 H |  |  |  |
| Comparative Example 1 | No uniform coating film formed | | | | |

TABLE 1-2

|  | Resistance to repeated cooling and heating | Water resistance | Moisture resistance | Adhesion (point) | Weatherability in accelerated test | Storage stability (day) |
| --- | --- | --- | --- | --- | --- | --- |
| Example 1 | good | good | good | 10 | good | 7 |

TABLE 1-2-continued

| | Resistance to repeated cooling and heating | Water resistance | Moisture resistance | Adhesion (point) | Weather-ability in accelerated test | Storage stability (day) |
|---|---|---|---|---|---|---|
| Example 2 | good | good | good | 10 | good | 10 |
| Example 3 | good | good | good | 10 | good | 5 |
| Example 4 | good | good | good | 10 | good | 5 |
| Example 5 | good | good | good | 10 | good | 10 |
| Example 6 | good | good | good | 10 | good | 10 |
| Example 7 | good | good | good | 10 | good | 10 |
| Example 8 | good | good | good | 10 | good | 8 |
| Example 9 | good | good | good | 10 | good | 9 |
| Comparative Example 1 | No uniform coating film formed | | | | | |

As shown in Table 1, the coating compositions of the present invention were kept fluid for 5 to 10 days after the curing agent was mixed and could be used for coating. Therefore, the coating compositions exhibited excellent workability and could be handled easily. Since the obtained coating films all exhibited excellent gloss and were transparent or translucent, the coating compositions could keep the excellent appearance when the compositions were applied to steel plates, an aluminum plate, a cement board, a glass plate and a methacrylic resin plate. The coating films exhibited excellent physical properties such as a high hardnesses, small water permeability and excellent acid resistance, flexibility, resistance to repeated cooling and heating, water resistance, moisture resistance, adhesion and weatherability and could protect the base material of the coating for a long time.

INDUSTRIAL APPLICABILITY

The coating composition of the present invention exhibits excellent storage stability after the addition of the curing agent, suppresses aggregation of fine silica particles during spray coating and can form a coating film having a high hardness and exhibiting excellent weatherability, water resistance, chemical resistance and adhesion when the coating composition is applied to the surface of base materials such as metal, wood, paper, cloth, glass, ceramics, concrete and synthetic resins.

What is claimed is:

1. A coating composition which comprises:
   (A) an alcohol dispersion which comprises silica having a hydrophobic surface and dispersed in an alcohol dispersion medium and has a content of silica in a solid substance of 80% by weight or more;
   (B) a solution comprising a silicone oligomer which is obtained by a reaction of an alkoxysilane with water and has an average structural unit represented by:

$R^1{}_n SiO_{x/2}(OH)_y(OR^2)_z$ wherein $R^1$ represents an alkyl group having 1 to 3 carbon atoms, phenyl group or vinyl group, a plurality of $R^1$ may represent a same group or different groups when the plurality of $R^1$ are present, $R^2$ represents an alkyl group having 1 to 3 carbon atoms, a plurality of $R^2$ may represent a same group or different groups when the plurality of $R^2$ are present and n, x, y and z represent numbers satisfying relations of: $0.8 \leq n \leq 1.7$, $2 < x < 3.2$, $y > 0$, $z > 0$ and $y+z=4-n-x$; and
   (C) a curing agent.

2. A coating composition according to claim 1, wherein a content of component (A) is 10 to 70% by weight as a solid substance and a content of component (B) is 90 to 30% by weight as a solid substance each based on a total amount of component (A) and component (B) as solid substances and a content of component (C) is 1 to 40 parts by weight per 100 parts by weight of a total amount of component (A) and component (B) as solid substances.

3. A coating composition according to claim 1, wherein the silica having a hydrophobic surface in component (A) is obtained by a reaction of fine silica particles with an organoalkoxysilane or an organohalosilane each having a structure represented by:

$R^3{}_m SiX_{4-m}$ wherein $R^3$ represents an alkyl group having 1 to 3 carbon atoms, phenyl group or vinyl group, m represents 1, 2 or 3, a plurality of $R^3$ may represent a same group or different groups when m represents 2 or 3 and X represents Cl, $OCH_3$ or $OC_2H_5$.

4. A coating composition according to claim 1, wherein the silica having a hydrophobic surface in component (A) is obtained by a reaction, in a presence of an amine-based silane coupling agent, of fine silica particles with an organoalkoxysilane having a structure represented by:

$R^3{}_m SiX_{4-m}$ wherein $R^3$ represents an alkyl group having 1 to 3 carbon atoms, phenyl group or vinyl group, m represents 1, 2 or 3, a plurality of $R^3$ may represent a same group or different groups when m represents 2 or 3 and X represents $OCH_3$ or $OC_2H_5$.

5. A coating composition according to claim 1, wherein the silicone oligomer in component (B) is prepared by using a metal chelate compound as a catalyst.

6. A coating composition according to claim 5, wherein a ligand of the metal chelate compound is at least one compound selected from β-diketones and cyclic polyethers having a large ring, wherein said cyclic polyethers are selected from the group consisting of 18-crown-6-potassium chelate compound salts, 12-crown-4-lithium chelate compound salts and 15-crown-5-sodium chelate compound salts.

7. A coating composition according to claim 1, wherein the silicone oligomer in component (B) is prepared by using, as a self catalyst, a solution comprising a silicon compound which is soluble in a hydrophilic organic solvent and has an average structural unit represented by:

$R^4{}_a SiO_{b/2}(OH)_c(OR^5)_d$ wherein $R^4$ represents an alkyl group having 1 to 3 carbon atoms, phenyl group or vinyl group, a plurality of $R^4$ may represent a same group or different groups when the plurality of $R^4$ are present, $R^5$ represents an ialkyl group having 1 to 3 carbon atoms, a plurality of $R^5$ may represent a same group or different groups when the plurality of $R^5$ are present and a, b, c and d represent numbers satisfying relations of: $0 \leq a < 3$, $0 < b < 4$, $c > 0$, $d \geq 0$ and $c+d=4-a-b$.

8. A coating composition according to claim 1, wherein component (C) is a solution comprising a complex having a structure represented by:

$$M(Che)_p(OR^6)_q$$

wherein M represents a metal having a valence of 3 or greater, Che represents a chelating agent, $R^6$ represents an alkyl group having 1 to 4 carbon atoms, p represents a number of 1 or greater and q represents a number of 2 or greater; or a polynuclear complex comprising said complex as a basic unit.

9. A coating composition according to claim 8, wherein the chelating agent is a β-diketone.

10. A coating composition according to claim 1, wherein component (C) comprises a compound which is selected from carboxylic acids, alcohols having carbonyl group and alcohols having ether group and has a boiling point of 200° C. or lower.

* * * * *